United States Patent
Biswas et al.

(10) Patent No.: US 11,729,296 B2
(45) Date of Patent: Aug. 15, 2023

(54) DYNAMICALLY SCALING CONTROL PLANE FOR INGRESS SERVICES FOR LARGE NUMBERS OF APPLICATIONS WITH MINIMAL TRAFFIC DISRUPTION

(71) Applicant: VMWARE, INC., Palo Alto, CA (US)

(72) Inventors: Sudipta Biswas, Bangalore (IN); Monotosh Das, Bangalore (IN); Hemant Kumar Shaw, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/393,533

(22) Filed: Aug. 4, 2021

(65) Prior Publication Data

US 2022/0385733 A1 Dec. 1, 2022

(30) Foreign Application Priority Data

May 25, 2021 (IN) .............................. 202141023346

(51) Int. Cl.
*H04L 67/60* (2022.01)
*G06F 9/50* (2006.01)
*H04L 61/4511* (2022.01)
*G06F 11/20* (2006.01)
*H04L 67/00* (2022.01)

(52) U.S. Cl.
CPC .............. *H04L 67/60* (2022.05); *G06F 9/505* (2013.01); *G06F 9/5038* (2013.01); *G06F 9/5077* (2013.01); *G06F 11/2048* (2013.01); *H04L 61/4511* (2022.05); *H04L 67/34* (2013.01)

(58) Field of Classification Search
CPC .. H04L 67/1023; H04L 67/34; G06F 11/1425; G06F 11/2048
See application file for complete search history.

(56) References Cited

U.S. PATENT DOCUMENTS

| | | | |
|---|---|---|---|
| 7,739,677 B1* | 6/2010 | Kekre | G06F 11/1425 717/121 |
| 2008/0320121 A1* | 12/2008 | Altaf | H04L 67/1023 709/224 |
| 2016/0179636 A1* | 6/2016 | Fitzpatrick | G06F 11/2048 714/4.12 |
| 2021/0120079 A1* | 4/2021 | Pahwa | H04L 67/34 |
| 2022/0107848 A1* | 4/2022 | Wang | H04L 41/5041 |

* cited by examiner

*Primary Examiner* — Barbara B Anyan
(74) *Attorney, Agent, or Firm* — Dinsmore & Shohl LLP (57) ABSTRACT

Dynamically scaling control plane for ingress services for large numbers of applications with minimal traffic disruption includes receiving an estimate of a number of applications to be executed by multiple clusters implemented by an orchestrator platform. Each cluster includes multiple containers. The multiple clusters implement a centralized controller that control execution of the applications by the multiple clusters. The centralized controller is sharded into a variable number of controllers that collectively control the estimated number of applications based on the estimate of the number of applications and a pre-determined number of applications that each controller can control. Each controller of the variable number of controllers controls an execution of a respective subset of the applications. In response to a change in the number of applications over time, the number of controllers is modified based on a number of applications to be executed by the multiple clusters at any given time.

33 Claims, 3 Drawing Sheets

DYNAMICALLY SCALING CONTROL PLANE FOR INGRESS SERVICES FOR LARGE NUMBERS OF APPLICATIONS WITH MINIMAL TRAFFIC DISRUPTION

RELATED APPLICATIONS

Benefit is claimed under 35 U.S.C. 119(a)-(d) to Foreign Application Serial No. 202141023346 filed in India entitled "DYNAMICALLY SCALING CONTROL PLANE FOR INGRESS SERVICES FOR LARGE NUMBERS OF APPLICATIONS WITH MINIMAL TRAFFIC DISRUPTION", on May 25, 2021, by VMware, Inc., which is herein incorporated in its entirety by reference for all purposes.

TECHNICAL FIELD

The present disclosure relates generally to distributed computing, and, more particularly, to methods and systems to balancing load in distributed computing.

BACKGROUND

Distributed computing is implemented by a network architecture in which control functions are allocated across multiple processor levels in the network. Distributed computing implements a data plane that moves data from a source to a destination in the network, and a control plane which determines a route taken by the data from the source to the destination. The control plane has a defined number of microservices that it can perform or to which it can be scaled up. The scalability limit of the control plane depends, in part, on the constituent components of the control plane itself, for example, on physical limitations of the machine such as the CPU or memory.

When an orchestrator platform implements clusters to execute microservices, then the control plane is divided (or sharded) into multiple control planes, and the microservices are distributed across all the control planes. In such a scenario, instances can arise in which one of the control planes is over-utilized, i.e., is executing close to or at max capacity, while another is under-utilized. Load balancing can involve transitioning the execution of microservices from an over-utilized control plane to an under-utilized control plane. Load balancing can also involve provisioning new control planes in response to an increase in the number of microservices being executed or de-commissioning a control plane in response to a decrease in the number of microservices. The operations of the clusters executing the microservices and network traffic between those clusters should not be interrupted during such provisioning or de-commissioning.

SUMMARY

This specification relates to dynamically scaling the control plane for ingress services for large number of applications with minimal traffic disruption.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Adoption of microservices based architecture leads to challenges with traditional control plane scalability. Such scalability problems could be attributed to resource limitations, capacity planning, and maintaining huge states for a large number of applications. This specification describes a controller of an orchestrator platform where a centralized control plane is used to program policies that are implemented by a distributed data plane. In some implementations, an agent software can be deployed to run inside a cluster implemented by an orchestrator platform. The agent software can reconcile states between the application programming interface (API) server of the orchestrator platform and the control plane. The agent updates the result into creating, changing, deleting (or a combination of them) traffic rules for microservices based applications.

Two conditions may lead to scalability of a centralized control plane. The first condition is when the orchestrator platform provisions or de-commissions a large volume of clusters. As the number of clusters increase, the centralized controller suffers from latency and multiple session management problems due to multiple orchestrator platform agents simultaneously interacting with the same controller. Consequently, the control plane is overprovisioned with resources, which, in turn, can lead to resource wastage and higher costs when the clusters are de-commissioned.

The second condition is when a cluster executes a large number of applications. In this instance, the agent transmits a correspondingly large volume of updates from the cluster to the centralized controller. Consequently, various resource constraints are observed on the controller to maintain the state of the large number of applications, which, in turn, leads to slower performance and expensive controller reboot/upgrade challenges. Simultaneously, the agent suffers from scalability challenges as well.

Data plane components are unique to each control plane and cannot be shared. If a given control plane/data plane combination can serve a specific number of applications (say, X) and the total number of microservices based applications requiring load balancing is, say, Y, then, if Y»X, a single control plane/data plane may not be sufficient to service the load balancing requests from all applications. This specification describes computer-implemented techniques by which a large volume of microservices applications executed by an orchestrator platform can be load balanced using a distributed control plane that employs an effective sharding mechanism that can scale the controllers dynamically without impacting traffic and based on the demands of application scale. Implementing the techniques described in this disclosure can yield advantages including seamless load balancing between microservices across control planes as the control planes are dynamically scaled up or down. The implementations result in better utilization of each control plane and minimizes (or avoids) traffic disruption on the application side during such scale up or scale down.

Figure 1:
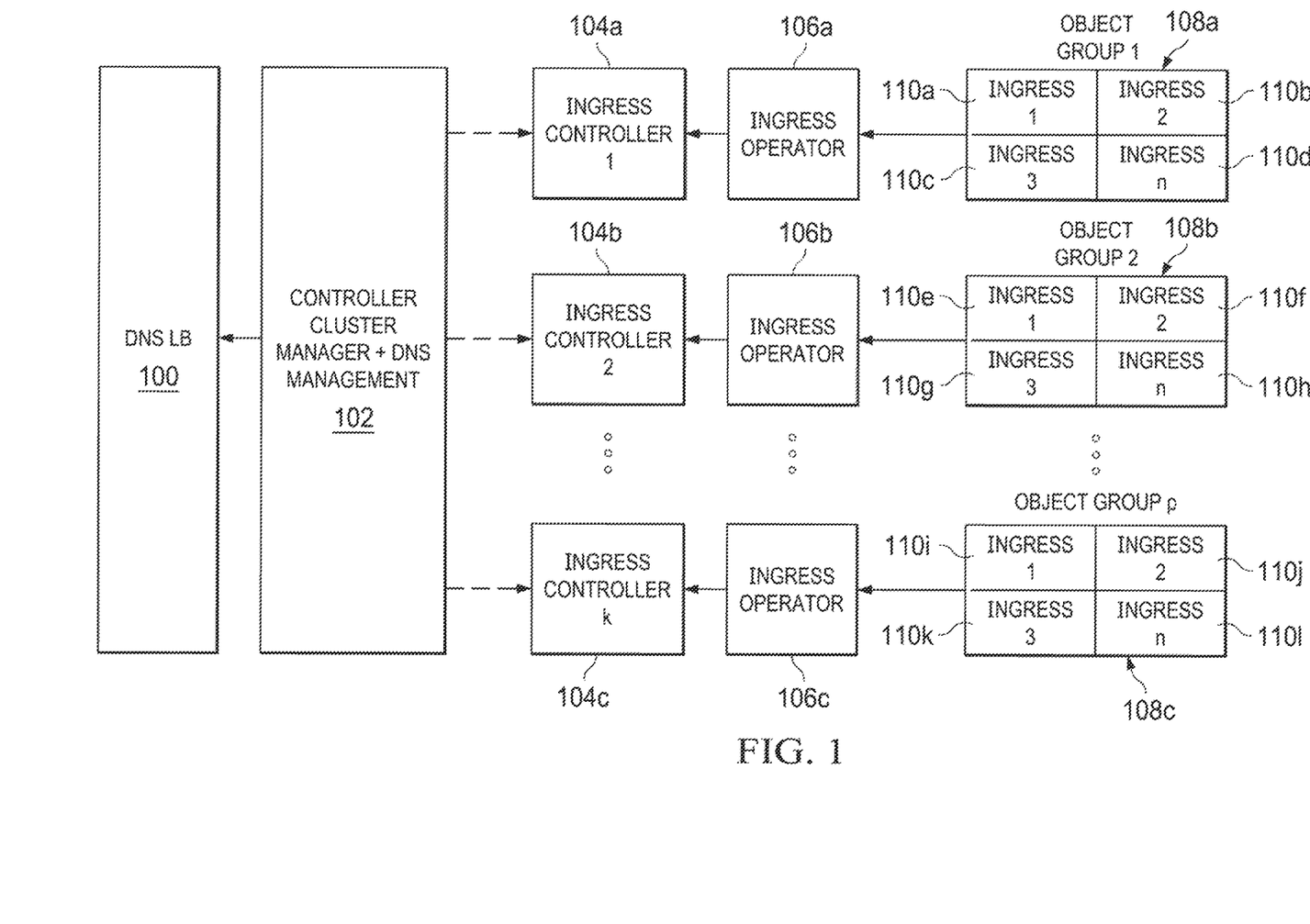
FIG. 1 is a schematic diagram showing component interaction during load balancing.

FIG. 1 is a schematic diagram showing component interaction during load balancing. Each component schematically shown in FIG. 1 can be implemented as a computer system that includes one or more hardware processors and a computer-readable medium (e.g., a non-transitory computer-readable medium) storing instructions, which when executed by the one or more hardware processors, can perform operations described here. Each component can be collectively implemented as a processing platform, for example, the processing platform 300 described below with reference to FIG. 3.

As described above, a given control plane is used to load balance a specific number of applications. This specification describes techniques to commission and de-commission control planes dynamically based on the demands of the application scale. To do so, the following components are used. A domain name server (DNS) load balancer 100 which provides dynamic DNS load balancing for applications distributed across one or more fully qualified domain names (FQDNs). A FQDN is a domain name that specifies its exact location in the tree hierarchy of the DNS. The DNS load balancer 100 is configured to efficiently distribute microservices applications across controllers (described below). The DNS load balancer 100 distributes DNS traffic based on the hostname of the traffic. For example, when a client sends a DNS request, the DNS Load Balancer 100 checks for the endpoints which can serve the hostname. If multiple backends are available for the same hostname, then the IP address of one of the backends is sent to the client, which can subsequently send all requests for the hostname to the selected backend IP. The DNS Load Balancer 100 continuously monitors the backend endpoints to check for reachability. If a backend becomes unreachable, the DNS Load Balancer 100 can select a new endpoint and send the selected endpoint to the client in response to a DNS request. As described in detail below, the DNS Load Balancer 100 is used to minimize traffic disruption during scale up and scale down.

The components include a manager 102 which is operatively connected to the DNS load balancer 100. The manager 102 includes a domain name server (DNS) manager which is used to program DNS rules on the DNS load balancer 100. The manager 102 also includes a controller cluster manager which is used to manage the lifecycle of a dynamic set of individual control planes. The controller cluster manager has access to the DNS and makes changes dynamically. The manager 102 is responsible for managing lifecycle of individual ingress controllers which includes bringing up (provisioning) and shutting down (de-commissioning) a controller. The manager 102 additionally notifies a new ingress controller about its unique identifier and total number of controllers which is used by the ingress controllers to decide which ingress objects should be handled by a particular ingress operator-ingress controller pair. The DNS manager listens for events from the ingress controllers about the hostname and IP address mappings, and adds the entries in the DNS Load Balancer 100.

The components include an ingress controller which is operatively connected to the manager 102, and which deploys the control plane that is configured to control (or support) execution of a fixed number of applications. The ingress controller is a component which creates a frontend endpoint for an application on the data path to handle traffic for that application. FIG. 1 shows three example controllers—ingress controller 104a, ingress controller 104b and ingress controller 104c. Each controller has an upper limit of a number of applications that the controller can control. A controller is considered over-utilized if the number of applications that the controller controls approaches the upper limit. In other words, the number of applications that the controller supports need not equal the upper limit for the controller to be considered over-utilized. Rather, if the number of applications is a percentage of the upper limit (e.g., 70% or other user-defined percentage), then the controller is considered over-utilized. Conversely, a controller is considered under-utilized if the number of applications that the controller controls is equal to or below a threshold value, which can be user-defined.

The components include an ingress operator which is operatively connected to the ingress controller, and which is an agent which runs inside a cluster implemented by the orchestrator platform and reconciles the state of objects in the orchestrator platform with control plane objects. For each cluster, there are multiple ingress operators (e.g., ingress operator 106a, ingress operator 106b, ingress operator 106c), one per controller, to handle applications to be load balanced in the cluster. One ingress operator is responsible for handling a group of applications and programming traffic rules in the controller.

Each ingress operator operatively manages an object group (e.g., object group 108a, object group 108b, object group 108c). Each object group includes multiple objects (e.g., ingress' 110a, b, c, d in object group 108a; ingress' 110e, f, g, h in object group 108b; ingress; 110i, j, k, l in object group 108c). An ingress is an object that allows access to cluster services from outside the cluster. The ingress defines a collection of rules that define which inbound connections reach which services. The ingress consolidates the routing rules into a single resource.

The manager 102 uses these components and an effective sharding mechanism (i.e., a mechanism to partition the control plane) to map a set of microservices to each control plane software irrespective of whether they belong to one or more clusters. Each control plane software runs its own instance of a DNS nameserver, which is used to resolve application FQDNs to their respective cluster local Internet Protocol (IP) addresses. A shard bucket is defined by the manager 102 (specifically, the controller manager) that maps a set of applications to a given control plane. The DNS nameservers are associated with each controller cluster and assumed to service up to 10,000 FQDN resolutions. The manager 102 can update the nameservers of the corporate DNS dynamically as needed. A global DNS is hosted in a primary controller that is also known as a "root" controller. The "root" controller is expected to run until explicitly torn down.

Figure 2:
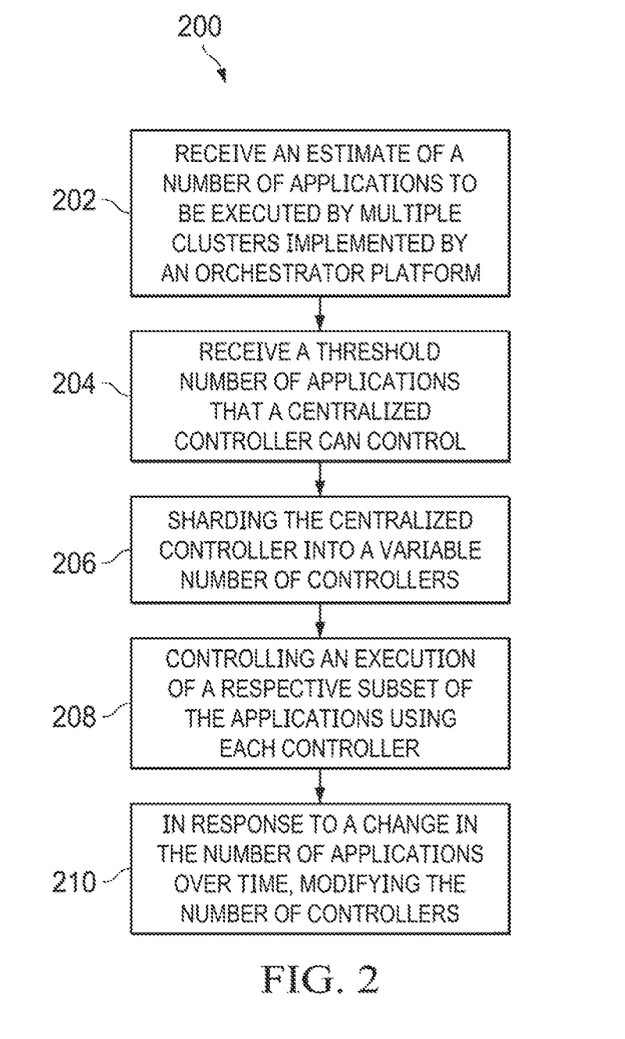
FIG. 2 is a flowchart of an example of a process of load balancing.

FIG. 2 is a flowchart of an example of a process 200 of load balancing implemented by the components schematically shown in FIG. 1. The operations are performed by or controlled by one or more or all of the components shown in FIG. 1. In some implementations, at 202, the manager 102 receives an estimate of a number of applications to be executed by multiple clusters implemented by an orchestrator platform. Each cluster includes multiple containers. The multiple containers implement a centralized controller that is configured to control execution of the applications by the multiple clusters. At 204, the manager 102 receives a threshold number of applications that the centralized controller is configured to control. At 206, the manager 102 shards or controls the sharding of the centralized controller into multiple controllers configured to collectively control the estimated number of applications, based on the estimate of the number of applications and a pre-determined number of applications that each controller of the multiple controllers is configured to control. At 208, each controller of the multiple controllers controls an execution of a respective subset of the applications. At 210, in response to a change in the number of applications over time, the manager 102 modifies the multiple controllers based on a number of applications to be executed by the multiple clusters at any given time. Details of each process step are described below.

During the initial bootup, the manager 102 defines an initial shard bucket of controllers, which is expected to grow or shrink (or both) with an increase or decrease (or both) of applications being serviced by the clusters. The manager 102 determines the shard bucket size through an initial estimate of applications that require load balancing. For example, the manager 102 can receive an estimate of a maximum number of applications to be load balanced equals 50,000 applications. The manager 102 receives or determines that a controller (e.g., an ingress controller) can handle 5,000 applications. On this basis, the manager determines that the initial bucket size is 10 (50,000 applications/5,000 applications per controller). The manager 102 shards or controls the sharding of the controller into the initial bucket size resulting in multiple controllers (e.g., ingress controllers 104a, 104b, 104c and so on).

Each ingress operator (e.g., ingress operator 106a, 106b, 106c) handles applications to be load balanced in each cluster (e.g., object group 108a, object group 108b, object group 108c). One ingress operator is responsible for handling a group of applications and programming one ingress controller. Whereas, during bootup, the manager 102 creates a fixed number of ingress operators and controllers as described above, the manager 102 can bring up (provision) or bring down (de-commission) an ingress operator based on changes to the number of applications in a cluster over time.

After sharding the controller into multiple controllers, as described above, the manager 102 determines the controller to which each application maps. The manager 102 does so based on the name of the application and the initial shard size at that time. Using this information, the manager 102 selects an ingress operator and a corresponding controller for processing the application. The manager 102 determines a controller identifier (controller ID) using a hash of each application. In some implementations, the manager 102 determines the controller ID using the formula shown in Eq. 1.

$$\text{Controller } ID = \frac{md5sum \text{ (application name)}}{\text{(total number of shard buckets of controllers)}} \quad \text{Eq. 1}$$

The ingress operator operatively connected to the identifier controller processes the application, creates required objects in the controller and then writes the Controller ID in the status field of the application. The manager 102 uses the status message while processing future updates for an application to ensure that an application is always mapped to one specific controller, if available, even if the number of shard buckets changes. After programming the controller, the manager 102 adds an entry in a corporate DNS to ensure that the application is reachable through its domain name. In this manner, the manager 102 determines multiple unique identifiers for the corresponding multiple controllers, associates a unique identifier of each controller to each application in the respective subset of the applications being executed by that controller, and adds the unique identifier to the DNA manager that maintains a log of the multiple controllers and the subset of applications being executed by each controller. The DNS manager associates the unique identifier with the respective controller and the respective subset of the applications.

As described above, in response to an increase in the number of applications over time, the manager 102 can scale up the number of controllers. To do so, the manager 102 can shard the centralized controller to generate an additional controller, thereby increasing the number of controllers by one. The manager 102 then determines a modified unique identifier for the additional controller. For example, the manager 102 determines a hash value of the new controller and uses the hash value in Eq. 2.

$$\text{New controller } ID = \frac{md5sum \text{ (application name)}}{\text{(total number of shard buckets of controllers + 1)}} \quad \text{Eq. 2}$$

The manager 102 associates the modified unique identifier to each application be executed by the additional controller using techniques similar to those described above. In addition, the manager 102 transmits the modified unique identifier to each of the other controllers. For existing applications, based on the Controller ID in the application status, the appropriate ingress operator continues to handle the application.

In some implementations, the manager 102 determines to scale up the number of controllers in response to determining that a controller is handling a number of applications equal to or greater than a threshold capacity level associated with that controller. For example, the threshold capacity level can be a user-defined value, such as 70% (or other fraction) of the maximum capacity level of the controller. That is, when the manager 102 determines that a number of applications that the controller is controlling is equal to or greater than the user-defined fraction multiplied by the maximum number of applications that the controller can control, then the manager 102 determines to scale up the number of controllers. Upon scale up, the manager 102 adds a new controller and updates the list of controllers to include the newly created controller and to exclude the over-utilized controller. No new application would be handled by the over-utilized controller. But, existing applications would continue to be handled by the same controller.

In some implementations, the manager 102 determines to scale down the number of controllers based on the predetermined number of applications that each controller is configured to control. Due to application sharding across multiple controllers, each controller may host a distributed number of applications mapped to it. Over a period of time, as the number of microservices are destroyed in the individual clusters, an application consolidation across controllers can reduce the number of control plane instances. This leads to cost reduction for running over-commissioned controllers. This is called scaling down of controllers.

To scale down, the manager 102 identifies a controller that is executing the fewest number of applications, and decommissions the identified controller. Prior to such decommissioning, the manager 102 replicates any remaining applications being executed by the controller to a different controller. Upon replication, the application is programmed across two local DNS nameservers—one in the controller identified to be decommissioned and the other in the new controller. The DNS nameservers are load balanced using a DNS load balancer. Then, the manager 102 adds a unique identifier associated with the new controller to the log maintained by the DNS manager. Having thus replicated the applications from the identified controller to the new controller, the manager 102 decommissions the identified controller. Also, the manager 102 removes the DNS nameserver from the DNS load balancer 100. When a controller is decommissioned, an entry for an ingress is deleted, and the controller informs the manager 102. The manager 102 checks if total number of ingresses serviced by the controller has fallen below the threshold. If yes, the manager 102 decrements bucket size by 1 by removing the under-utilized controller and notifies all existing controllers of this removal. The manager 102 assigns the ingresses handled by the controller being decommissioned to other controllers as per the new bucket size. The manager 102 adds new entries in controllers for these ingresses and adds additional entries in the DNS load balancer 100. The manager 100 waits for a time greater than the time to life (TTL) expiry time of the DNS entries in the client. The TTL expiry is configurable if no downtime is a requirement. The manager 102 then decommissions the controller and removes its DNS entries from the DNS load balancer 100.

Figure 3:
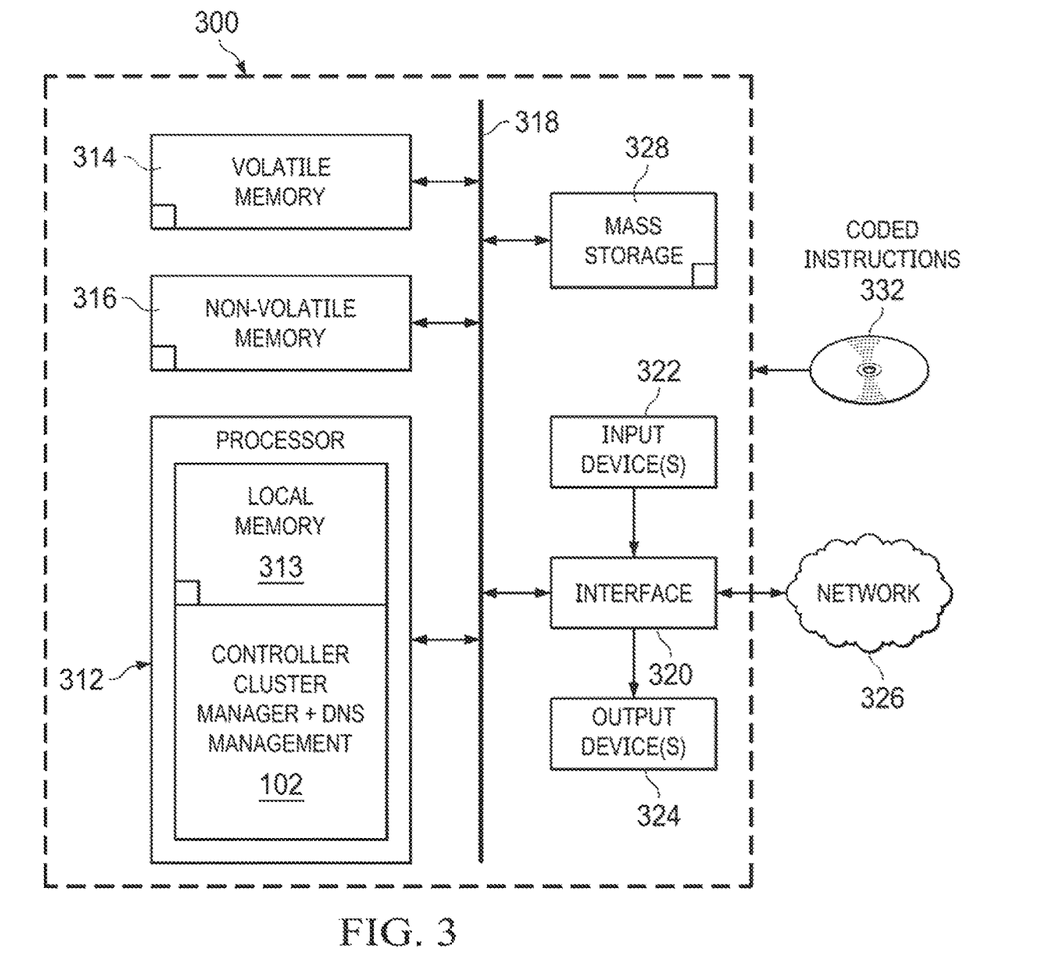
FIG. 3 is a block diagram of an example of a processing platform.

FIG. 3 is a block diagram of an example of a processing platform 300 configured to execute the techniques described in this disclosure, specifically, the methods described above with reference to FIGS. 1 and 2. The processor platform 300 can be, for example, a server, a personal computer, a workstation, a self-learning machine (e.g., a neural network), a mobile device (e.g., a cell phone, a smart phone, a tablet computer), a personal digital assistant (PDA), an Internet appliance, or any other type of computing device. In some implementations, the processor 312 implements the components shown in FIG. 1, especially, the manager 102.

The processor platform 300 includes a processor 312, which is hardware. For example, the processor 312 can be implemented by one or more integrated circuits, logic circuits, microprocessors, graphics processing units (GPUs), digital signal processors (DSPs), or controllers. The hardware processor 312 can be a semiconductor, e.g., silicon, based device. The hardware processor 312 can implement the components of the systems (for example, system 100, system 700) described with reference to FIGS. 1 and 2.

The processor 312 includes a local memory 313 (e.g., a cache). The process 312 is in communication with a main memory including a volatile memory 314 and a non-volatile memory 316 via a bus 318. The volatile memory 314 can be implemented by synchronous dynamic random access memory (SDRAM), dynamic random access memory (DRAM) or other type of random access memory device. The non-volatile memory 316 can be implemented by flash memory and/or any other desired type of memory device. A memory controller controls access to the main memory 314, 316.

The process platform 300 also includes an interface circuit 320 implemented by any type of interface standard, for example, an Ethernet interface, a universal serial bus (USB), a wired or wireless interface, a near field communication (NFC) interface and/or a PCI express interface. One or more input devices 322 are connected to the interface circuit 320. The input devices permit a user to enter data and/or commands to the processor 312. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 324 are also connected to the interface circuit 320. The output devices 324 can be implemented, for example, by display devices, e.g., light emitting diode (LED), an organic LED (OLED), a liquid crystal display (LCD), a cathode ray tube display (CRT), an in-place switching (IPS) display, a touchscreen, etc. and/or a tactile output device, a printer and/or speaker. The interface circuit 320 typically includes a graphics driver card, a graphics driver chip and/or a graphics driver processor.

The interface circuit 320 also includes a communication device such as a transmitter, a receiver, a transceiver, a modem, a residential gateway, a wireless access point, and/or a network interface to facilitate exchange of data with external machines (e.g., computing devices of any kind) via a network 326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 300 also includes one or more mass storage devices 328 for storing software and/or data. Examples of such mass storage devices 328 include floppy disk drives, hard disk drives, compact disk drives, redundant array of independent disks (RAID) systems, digital versatile disk (DVD) drives, or combinations of them.

Machine executable instructions 332 represented by the flowchart of FIG. 3 can be stored in the mass storage device 328, in the volatile memory 314, in the non-volatile memory 316, and/or on a removable non-transitory computer readable storage medium such as a CD or DIV.

Certain aspects of the subject matter described here can be implemented as a method. An estimate of a number of applications to be executed by multiple clusters implemented by an orchestrator platform is received. Each cluster includes multiple containers. The multiple clusters implement a centralized controller configured to control execution of the applications by the multiple clusters. A threshold number of applications that the centralized controller is configured to control is received. The centralized controller is sharded into a variable number of controllers configured to collectively control the estimated number of applications based on the estimate of the number of applications and a pre-determined number of applications that each controller is configured to control. Each controller of the variable number of controllers controls an execution of a respective subset of the applications. In response to a change in the number of applications over time, the variable number of controllers is modified based on a number of applications to be executed by the multiple clusters at any given time.

An aspect taken alone or combinable with any other aspect includes the following features. To shard the centralized controller into the variable number of controllers, multiple unique identifiers for the corresponding variable multiple of controllers is determined. A unique identifier of each controller is associated to each application in the respective subset of the applications being executed by that controller. The unique identifier is added to a domain name service (DNS) manager that maintains a log of the variable number of the controllers and the subset of applications being executed by each controller. The DNS manager associates the unique identifier with the respective controller and the respective subset of the applications.

An aspect taken alone or combinable with any other aspect includes the following features. To determine each identifier of the multiple unique identifiers, a hash of each application in the respective subset of the applications being executed by that controller is determined, and the hash is divided by a number of the variable number of controllers.

An aspect taken alone or combinable with any other aspect includes the following features. Modifying the variable number of controllers includes scaling up the variable number of controllers in response to an increase in the number of applications over time.

An aspect taken alone or combinable with any other aspect includes the following features. To scale up the variable number of controllers, the centralized controller is sharded to generate an additional controller, thereby increasing the number of the variable number of controllers by one. A modified unique identifier is determined for the additional controller. The modified unique identifier is associated to each application be executed by the additional controller. The modified unique identifier is transmitted to each of the other controllers of the variable number of controllers.

An aspect taken alone or combinable with any other aspect includes the following features. To determine the modified unique identifier, a hash of each application to be executed by the additional controller is determined, and the hash is divided by a number of the variable number of controllers plus one.

An aspect taken alone or combinable with any other aspect includes the following features. The variable number of controllers is scaled up in response to determining that a controller of the variable number of controllers is handling a number of applications equal to or greater than a threshold capacity level associated with that controller.

An aspect taken alone or combinable with any other aspect includes the following features. The threshold capacity level is 70% of a maximum capacity level associated with that controller.

An aspect taken alone or combinable with any other aspect includes the following features. Modifying the number of controllers includes scaling down the variable number of controllers in response to a decrease in the number of applications over time.

An aspect taken alone or combinable with any other aspect includes the following features. The variable number of controllers is scaled down based on the pre-determined number of applications that each controller of the variable number of controllers is configured to control.

An aspect taken alone or combinable with any other aspect includes the following features. To scale down the variable number of controllers, a controller from among the variable number of controllers which executes a fewest number of applications is identified, and the identified controller is decommissioned.

An aspect taken alone or combinable with any other aspect includes the following features. To decommission the identified controller, each application executed by the identified controller is replicated to a new controller. A unique identifier associated with the new controller is added to the log maintained by the DNS manager. The identified controller is removed from the log.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a system that includes one or more processors including a hardware-based processor, and a memory storage including a non-transitory computer-readable medium storing instructions which, when executed by the one or more processors performs operations including the methods described here.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In certain implementations, multitasking and parallel processing can be advantageous.

What is claimed is:

1. A method comprising:
    receiving an estimate of a number of applications to be executed by a plurality of clusters implemented by an orchestrator platform, each cluster comprising a plurality of containers, the plurality of clusters implementing a centralized controller configured to control execution of applications by the plurality of clusters;
    receiving a threshold number of applications that the centralized controller is configured to control;
    sharding the centralized controller into a variable plurality of controllers configured to collectively control the applications based on the estimate of the number of applications and a pre-determined number of applications that each controller of the variable plurality of controllers is configured to control, wherein sharding the centralized controller into the variable plurality of controllers comprises:
        determining a plurality of unique identifiers for the variable plurality of controllers;
        for each controller of the variable plurality of controllers, associating a unique identifier of the controller with each application in a respective subset of the applications being executed by the controller; and
        for each of the plurality of unique identifiers, adding the unique identifier to a domain name service (DNS) manager that maintains a log of the variable plurality of controllers and the respective subset of applications being executed by each controller of the variable plurality of controllers, wherein the DNS manager associates the unique identifier of the controller with the respective controller and the respective subset of the applications being executed by the controller;
    controlling, by each controller of the variable plurality of controllers, an execution of the respective subset of the applications; and
    in response to a change in the estimate of the number of applications over time, modifying the variable plurality of controllers based on the estimate of the number of applications to be executed by the plurality of clusters at any given time.

2. The method of claim 1, wherein determining the plurality of unique identifiers comprises, for each controller of the variable plurality of controllers:
   determining a hash of each application in the respective subset of the applications being executed by the controller; and
   dividing the hash by a number of the variable plurality of controllers.

3. The method of claim 2, wherein modifying the variable plurality of controllers comprises scaling up the variable plurality of controllers in response to an increase in the estimate of the number of applications over time.

4. The method of claim 3, wherein scaling up the variable plurality of controllers comprises:
   sharding the centralized controller to generate an additional controller thereby increasing the number of the variable plurality of controllers by one;
   determining a modified unique identifier for the additional controller;
   associating the modified unique identifier to each application to be executed by the additional controller; and
   transmitting the modified unique identifier to each of the variable plurality of controllers.

5. The method of claim 4, wherein determining the modified unique identifier comprises:
   determining a hash of each application to be executed by the additional controller; and
   dividing the hash by the number of the variable plurality of controllers plus one.

6. The method of claim 3, further comprising scaling up the variable plurality of controllers in response to determining that a first controller of the variable plurality of controllers is handling a first number of applications equal to or greater than a threshold capacity level associated with the first controller.

7. The method of claim 6, wherein the threshold capacity level is 70% of a maximum capacity level associated with the first controller.

8. The method of claim 2, wherein modifying the variable plurality of controllers comprises scaling down the variable plurality of controllers in response to a decrease in the estimate of the number of applications over time.

9. The method of claim 8, wherein the variable plurality of controllers is scaled down based on the pre-determined number of applications that each controller of the variable plurality of controllers is configured to control.

10. The method of claim 8, wherein scaling down the variable plurality of controllers comprises:
    identifying a controller from among the variable plurality of controllers which executes a fewest number of applications; and
    decommissioning the identified controller.

11. The method of claim 10, wherein decommissioning the identified controller comprises:
    replicating each application executed by the identified controller to a new controller;
    adding a unique identifier associated with the new controller to the log maintained by the DNS manager; and
    removing the identified controller from the log.

12. A non-transitory computer-readable medium comprising instruction that, when executed by one or more processors of a computing system, cause the computing system to perform operations comprising:
    receiving an estimate of a number of applications to be executed by a plurality of clusters implemented by an orchestrator platform, each cluster comprising a plurality of containers, the plurality of clusters implementing a centralized controller configured to control execution of applications by the plurality of clusters;
    receiving a threshold number of applications that the centralized controller is configured to control;
    sharding the centralized controller into a variable plurality of controllers configured to collectively control the applications based on the estimate of the number of applications and a pre-determined number of applications that each controller of the variable plurality of controllers is configured to control, wherein sharding the centralized controller into the variable plurality of controllers comprises:
        determining a plurality of unique identifiers for the variable plurality of controllers;
        for each controller of the variable plurality of controllers, associating a unique identifier of the controller with each application in a respective subset of the applications being executed by the controller; and
        for each of the plurality of unique identifiers, adding the unique identifier to a domain name service (DNS) manager that maintains a log of the variable plurality of controllers and the respective subset of applications being executed by each controller of the variable plurality of controllers, wherein the DNS manager associates the unique identifier of the controller with the respective controller and the respective subset of the applications being executed by the controller;
    controlling, by each controller of the variable plurality of controllers, an execution of the respective subset of the applications; and
    in response to a change in the estimate of the number of applications over time, modifying the variable plurality of controllers based on the estimate of the number of applications to be executed by the plurality of clusters at any given time.

13. The non-transitory computer-readable medium of claim 12, wherein determining the plurality of unique identifiers comprises, for each controller of the variable plurality of controllers:
    determining a hash of each application in the respective subset of the applications being executed by the controller; and
    dividing the hash by a number of the variable plurality of controllers.

14. The non-transitory computer-readable medium of claim 13, wherein modifying the variable plurality of controllers comprises scaling up the variable plurality of controllers in response to an increase in the estimate of the number of applications over time.

15. The non-transitory computer-readable medium of claim 14, wherein scaling up the variable plurality of controllers comprises:
    sharding the centralized controller to generate an additional controller thereby increasing the number of the variable plurality of controllers by one;
    determining a modified unique identifier for the additional controller;
    associating the modified unique identifier to each application to be executed by the additional controller; and
    transmitting the modified unique identifier to each of the variable plurality of controllers.

16. The non-transitory computer-readable medium of claim 15, wherein determining the modified unique identifier comprises:
 determining a hash of each application to be executed by the additional controller; and
 dividing the hash by the number of the variable plurality of controllers plus one.

17. The non-transitory computer-readable medium of claim 14, wherein the operations further comprise scaling up the variable plurality of controllers in response to determining that a first controller of the variable plurality of controllers is handling a first number of applications equal to or greater than a threshold capacity level associated with the first controller.

18. The non-transitory computer-readable medium of claim 17, wherein the threshold capacity level is 70% of a maximum capacity level associated with the first controller.

19. The non-transitory computer-readable medium of claim 13, wherein modifying the variable plurality of controllers comprises scaling down the variable plurality of controllers in response to a decrease in the estimate of the number of applications over time.

20. The non-transitory computer-readable medium of claim 19, wherein the variable plurality of controllers is scaled down based on the pre-determined number of applications that each controller of the variable plurality of controllers is configured to control.

21. The non-transitory computer-readable medium of claim 19, wherein scaling down the variable plurality of controllers comprises:
 identifying a controller from among the variable plurality of controllers which executes a fewest number of applications; and
 decommissioning the identified controller.

22. The non-transitory computer-readable medium of claim 21, wherein decommissioning the identified controller comprises:
 replicating each application executed by the identified controller to a new controller;
 adding a unique identifier associated with the new controller to the log maintained by the DNS manager; and
 removing the identified controller from the log.

23. A system comprising:
 one or more processors; and
 at least one memory coupled to the one or more processors, the one or more processors configured to:
  receive an estimate of a number of applications to be executed by a plurality of clusters implemented by an orchestrator platform, each cluster comprising a plurality of containers, the plurality of clusters implementing a centralized controller configured to control execution of applications by the plurality of clusters;
  receive a threshold number of applications that the centralized controller is configured to control;
  shard the centralized controller into a variable plurality of controllers configured to collectively control the applications based on the estimate of the number of applications and a pre-determined number of applications that each controller of the variable plurality of controllers is configured to control, wherein to shard the centralized controller into the variable plurality of controllers comprises to:
   determine a plurality of unique identifiers for the variable plurality of controllers;
   for each controller of the variable plurality of controllers, associate a unique identifier of the controller with each application in a respective subset of the applications being executed by the controller; and
   for each of the plurality of unique identifiers, add the unique identifier to a domain name service (DNS) manager that maintains a log of the variable plurality of controllers and the respective subset of applications being executed by each controller of the variable plurality of controllers, wherein the DNS manager associates the unique identifier of the controller with the respective controller and the respective subset of the applications being executed by the controller;
  control, by each controller of the variable plurality of controllers, an execution of the respective subset of the applications; and
  in response to a change in the estimate of the number of applications over time, modify the variable plurality of controllers based on the estimate of the number of applications to be executed by the plurality of clusters at any given time.

24. The system of claim 23, wherein to determine each identifier of the plurality of unique identifiers comprises to, for each controller of the variable plurality of controllers:
 determine a hash of each application in the respective subset of the applications being executed by the controller; and
 divide the hash by a number of the variable plurality of controllers.

25. The system of claim 24, wherein to modify the variable plurality of controllers comprises to scale up the variable plurality of controllers in response to an increase in the estimate of the number of applications over time.

26. The system of claim 25, wherein to scale up the variable plurality of controllers comprises to:
 shard the centralized controller to generate an additional controller thereby increasing the number of the variable plurality of controllers by one;
 determine a modified unique identifier for the additional controller;
 associate the modified unique identifier to each application to be executed by the additional controller; and
 transmit the modified unique identifier to each of the variable plurality of controllers.

27. The system of claim 26, wherein to determine the modified unique identifier comprises to:
 determine a hash of each application to be executed by the additional controller; and
 divide the hash by the number of the variable plurality of controllers plus one.

28. The system of claim 25, wherein the one or more processors are further configured to scale up the variable plurality of controllers in response to determining that a first controller of the variable plurality of controllers is handling a first number of applications equal to or greater than a threshold capacity level associated with the first controller.

29. The system of claim 28, wherein the threshold capacity level is 70% of a maximum capacity level associated with the first controller.

30. The system of claim 24, wherein to modify the variable plurality of controllers comprises to scale down the variable plurality of controllers in response to a decrease in the estimate of the number of applications over time.

31. The system of claim 30, wherein the variable plurality of controllers is scaled down based on the pre-determined number of applications that each controller of the variable plurality of controllers is configured to control.

32. The system of claim 30, wherein to scale down the variable plurality of controllers comprises to:
- identify a controller from among the variable plurality of controllers which executes a fewest number of applications; and
- decommission the identified controller.

33. The system of claim 32, wherein to decommission the identified controller comprises to:
- replicate each application executed by the identified controller to a new controller;
- add a unique identifier associated with the new controller to the log maintained by the DNS manager; and
- remove the identified controller from the log.

* * * * *